US009817700B2

(12) United States Patent
Caufield et al.

(10) Patent No.: US 9,817,700 B2
(45) Date of Patent: *Nov. 14, 2017

(54) DYNAMIC DATA PARTITIONING FOR OPTIMAL RESOURCE UTILIZATION IN A PARALLEL DATA PROCESSING SYSTEM

(75) Inventors: Brian K. Caufield, Livermore, CA (US); Fan Ding, San Jose, CA (US); Mi Wan Shum, San Jose, CA (US); Dong Jie Wei, Beijing (CN); Samuel H K Wong, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 696 days.

This patent is subject to a terminal disclaimer.

(21) Appl. No.: 13/094,074

(22) Filed: Apr. 26, 2011

(65) Prior Publication Data

US 2012/0278586 A1 Nov. 1, 2012

(51) Int. Cl.
G06F 12/08 (2016.01)
G06F 12/00 (2006.01)
G06F 9/44 (2006.01)
G06F 9/50 (2006.01)

(52) U.S. Cl.
CPC .................... *G06F 9/505* (2013.01)

(58) Field of Classification Search
CPC ....................................................... G06F 9/505
See application file for complete search history.

(56) References Cited

U.S. PATENT DOCUMENTS

| 5,758,345 | A | * | 5/1998 | Wang | |
| 5,784,698 | A | * | 7/1998 | Brady | G06F 12/023 710/56 |
| 5,842,035 | A | * | 11/1998 | Nishikawa | G06F 15/8007 712/14 |

(Continued)

OTHER PUBLICATIONS

F. Bonomi, et al., "An Adaptive Join-The-Biased-Queue Rule for Load Sharing on Distributed Computer Systems", Proceedings of the 28th IEEE Conference on Decision and Control, Dec. 13-15, 1989, 7 pages.

(Continued)

*Primary Examiner* — Daniel C Chappell
*Assistant Examiner* — Mohamed Gebril
(74) *Attorney, Agent, or Firm* — Susan Murray; Edell, Shapiro & Finnan, LLC (57) ABSTRACT

A method, computer program product, and system for dynamically distributing data for parallel processing in a computing system, comprising allocating a data buffer to each of a plurality of data partitions, where each data buffer stores data to be processed by its corresponding data partition, distributing data in multiple rounds to the data buffers for processing by the data partitions, where in each round the data is distributed based on a determined data processing capacity for each data partition, and where a greater amount of data is distributed to the data partitions with higher determined processing capacities, and periodically monitoring usage of each data buffer and re-determining the determined data processing capacity of each data partition based on its corresponding data buffer usage.

19 Claims, 7 Drawing Sheets

(56) References Cited

U.S. PATENT DOCUMENTS

| | | | | |
|---|---|---|---|---|
| 6,141,737 A * | 10/2000 | Krantz | G06F 12/0875 | 709/200 |
| 6,272,612 B1 * | 8/2001 | Bordaz et al. | | 711/203 |
| 6,295,575 B1 * | 9/2001 | Blumenau et al. | | 711/5 |
| 6,324,632 B1 * | 11/2001 | McIntosh-Smith | | 711/173 |
| 6,487,640 B1 * | 11/2002 | Lipasti | | 711/140 |
| 6,499,083 B1 * | 12/2002 | Hamlin | | 711/112 |
| 6,665,777 B2 * | 12/2003 | West | | 711/147 |
| 6,721,826 B2 * | 4/2004 | Hoglund | | 710/52 |
| 6,851,030 B2 * | 2/2005 | Tremaine | | 711/160 |
| 6,865,647 B2 * | 3/2005 | Olarig et al. | | 711/129 |
| 7,143,240 B2 * | 11/2006 | Hsu et al. | | 711/128 |
| 7,165,130 B2 * | 1/2007 | LeBlanc et al. | | 710/52 |
| 7,296,112 B1 * | 11/2007 | Yarlagadda | G06F 12/06 | 711/105 |
| 7,424,574 B1 * | 9/2008 | Ahrens et al. | | 711/114 |
| 7,562,090 B2 * | 7/2009 | Lohman et al. | | |
| 7,594,057 B1 * | 9/2009 | Gandhi et al. | | 710/308 |
| 7,613,897 B2 * | 11/2009 | Armstrong et al. | | 711/173 |
| 7,779,224 B2 * | 8/2010 | Zohar et al. | | 711/173 |
| 7,831,796 B2 * | 11/2010 | Bansal et al. | | 711/170 |
| 8,146,091 B2 * | 3/2012 | Johnson | G06F 9/5077 | 718/104 |
| 8,250,281 B2 * | 8/2012 | Bauman et al. | | 711/6 |
| 8,279,885 B2 * | 10/2012 | Riddle | | 370/412 |
| 8,347,061 B2 * | 1/2013 | Varma et al. | | 711/173 |
| 8,769,201 B2 * | 7/2014 | Hasenplaugh | G06F 9/5016 | 711/118 |
| 2003/0202525 A1 * | 10/2003 | Nagatomo | H04L 12/5693 | 370/411 |
| 2004/0141494 A1 * | 7/2004 | Beshai et al. | | 370/352 |
| 2006/0248287 A1 * | 11/2006 | Buyuktosunoglu et al. | | 711/146 |
| 2007/0143460 A1 * | 6/2007 | Ben-David | G06F 9/505 | 709/223 |
| 2007/0162720 A1 * | 7/2007 | Branda | G06F 9/5077 | 711/173 |
| 2008/0030764 A1 * | 2/2008 | Zhu et al. | | 358/1.15 |
| 2008/0071755 A1 | 3/2008 | Barsness et al. | | |
| 2008/0140945 A1 * | 6/2008 | Salessi | G06F 3/061 | 711/148 |
| 2008/0294537 A1 | 11/2008 | Mishra et al. | | |
| 2008/0310555 A1 | 12/2008 | Kee | | |
| 2009/0070769 A1 | 3/2009 | Kisel | | |
| 2009/0217288 A1 * | 8/2009 | Neubauer | G06F 9/505 | 718/105 |
| 2009/0265397 A1 | 10/2009 | Williams | | |
| 2010/0115246 A1 * | 5/2010 | Seshadri | G06F 17/30445 | 712/225 |
| 2010/0115527 A1 | 5/2010 | Kotlyar et al. | | |
| 2010/0262762 A1 * | 10/2010 | Borchers et al. | | 711/103 |
| 2011/0004740 A1 * | 1/2011 | Konno et al. | | 712/30 |
| 2011/0113215 A1 * | 5/2011 | Thomas et al. | | 711/173 |
| 2012/0131257 A1 * | 5/2012 | Rudosky et al. | | 711/5 |
| 2012/0254597 A1 * | 10/2012 | Delling | G06F 17/11 | 712/233 |
| 2012/0272035 A1 * | 10/2012 | Seno | | 711/173 |
| 2012/0278587 A1 | 11/2012 | Caufield et al. | | |

OTHER PUBLICATIONS

M. O'Nils, et al., "Data Partitioning for Parallel Implementation of Real-Time Video Processing Systems", 4 pages.
R. Hartenstein, et al., "A Partitioning Programming Environment for a Novel Parallel Architecture", 1996 IEEE Proceedings of IPPS '96, pp. 544-548.
International Search Report and Written Opinion for PCT/EP2012/056132, dated Jun. 5, 2012, 10 pages.
O'Nils et al.; "Data Partitioning for Parallel Implementation of Real-Time Video Processing Systems", Proceedings European Conf. on, Aug. 28-Sep. 2, 2005, pp. 213-216.
Hartenstein et al.; "A Partitioning Programming Environment for a Novel Parallel Architecture", Proceedings, 10th Inter. Conf. on, Apr. 15-19, 1996, pp. 544-548.

* cited by examiner

DYNAMIC DATA PARTITIONING FOR OPTIMAL RESOURCE UTILIZATION IN A PARALLEL DATA PROCESSING SYSTEM

BACKGROUND

1. Technical Field

The present invention relates generally to parallel data processing, and more particularly to the use of a dynamic data partitioning scheme for optimal resource utilization in a parallel data processing system.

2. Discussion of Related Art

Data partitioning is a widely used technique in parallel data processing to divide work among many parallel processes or threads. Multiple instances of a dataflow are created (called partitions), each to process some fraction of the overall data set in parallel, thus enabling scalability of the data flow. In recent years, computer systems have been moving in a direction of increasing the number of processor cores and threads, either on a single system or among a group of systems such as a distributed processing system. Data partitioning is one way to take advantage of multiprocessor systems by using parallel data processing streams to operate on the partitioned data. This mechanism is used in parallel databases and other parallel data processing engines such as IBM® InfoSphere™ DataStage® to perform high volume data manipulation tasks. (IBM, InfoSphere and DataStage are trademarks of International Business Machines Corporation, registered in many jurisdictions worldwide.)

A popular method for partitioning data is "round robin" partitioning. In this method, each partition is given one unit of data (e.g., a table row or record) at a time in a cycle, like a card dealer distributing cards to players. This method ensures that each partition is given an equal amount of data to processes (except on the last cycle when we may run out of data before the cycle completes). Therefore, the round robin partitioning scheme produces equally balanced data partitions in terms of the amount of data each partition has to process. This system works well if each partition is able to process an equal portion of the data and perform the same amount of work as the other partitions. In some multiprocessor systems, however, some partitions may be slower than others, and overall data performance may become gated by the lowest performing partition, thereby leading to system under-utilization and overall decreased throughput.

BRIEF SUMMARY

Accordingly, embodiments of the present invention include a method, computer program product and a system for dynamically distributing data for parallel processing in a computing system, comprising allocating a data buffer to each of a plurality of data partitions, wherein each data buffer stores data to be processed by its corresponding data partition, distributing data in multiple rounds to the data buffers for processing by the data partitions, wherein in each round the data is distributed based on a determined data processing capacity for each data partition, wherein a greater amount of data is distributed to the data partitions with higher determined processing capacities, and periodically monitoring usage of each data buffer and re-determining the determined data processing capacity of each data partition based on its corresponding data buffer usage.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
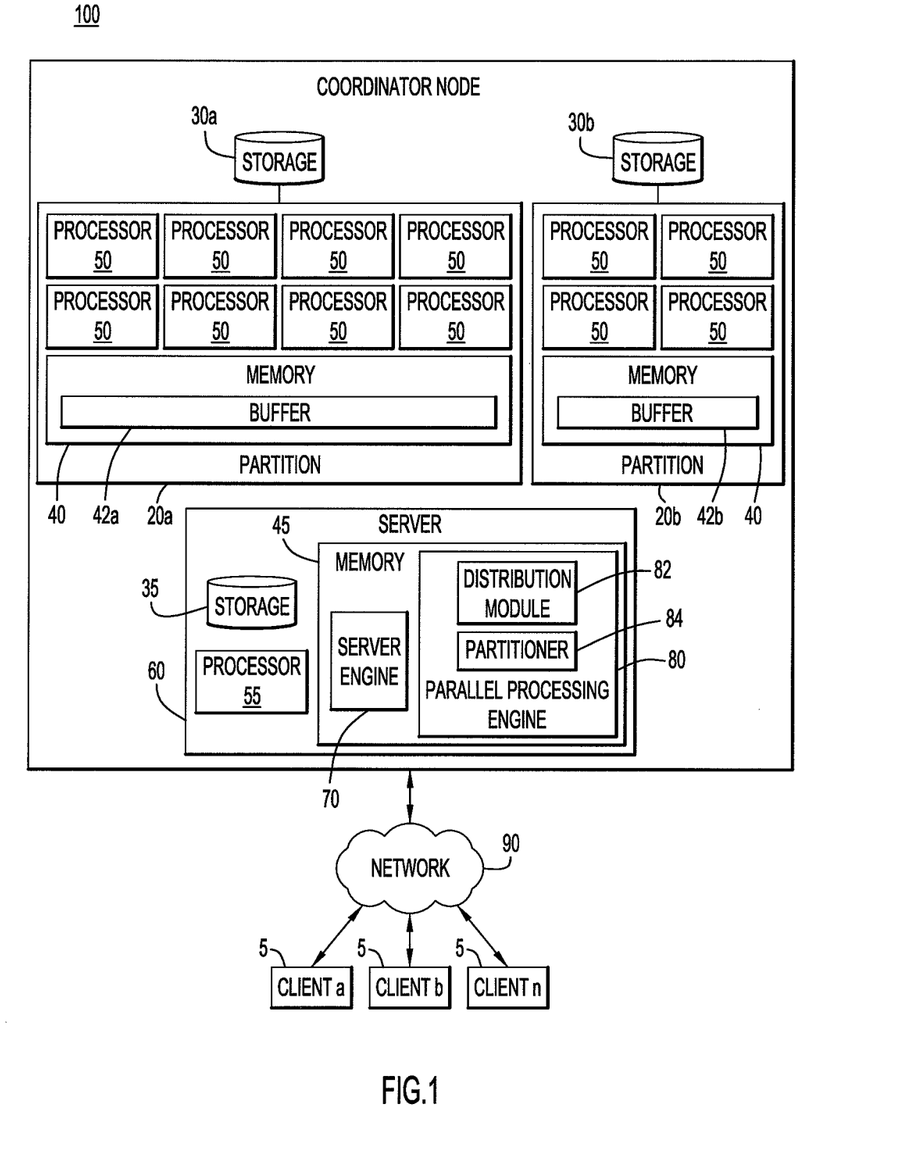
FIG. 1 is a block diagram illustrating a data processing system according to a first embodiment of the present invention.
Figure 2:
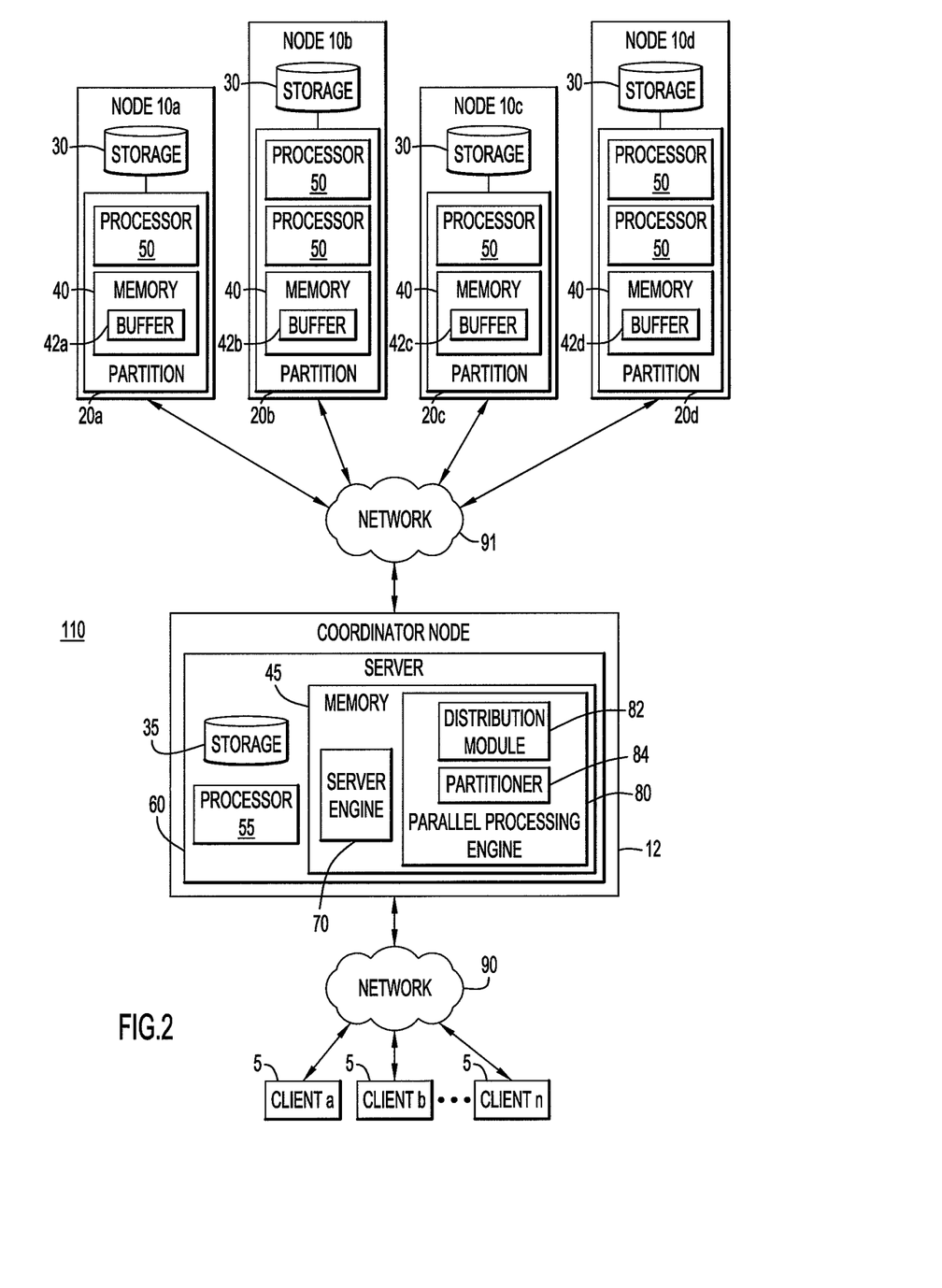
FIG. 2 is a block diagram illustrating a data processing system according to a second embodiment of the present invention.
Figure 3:
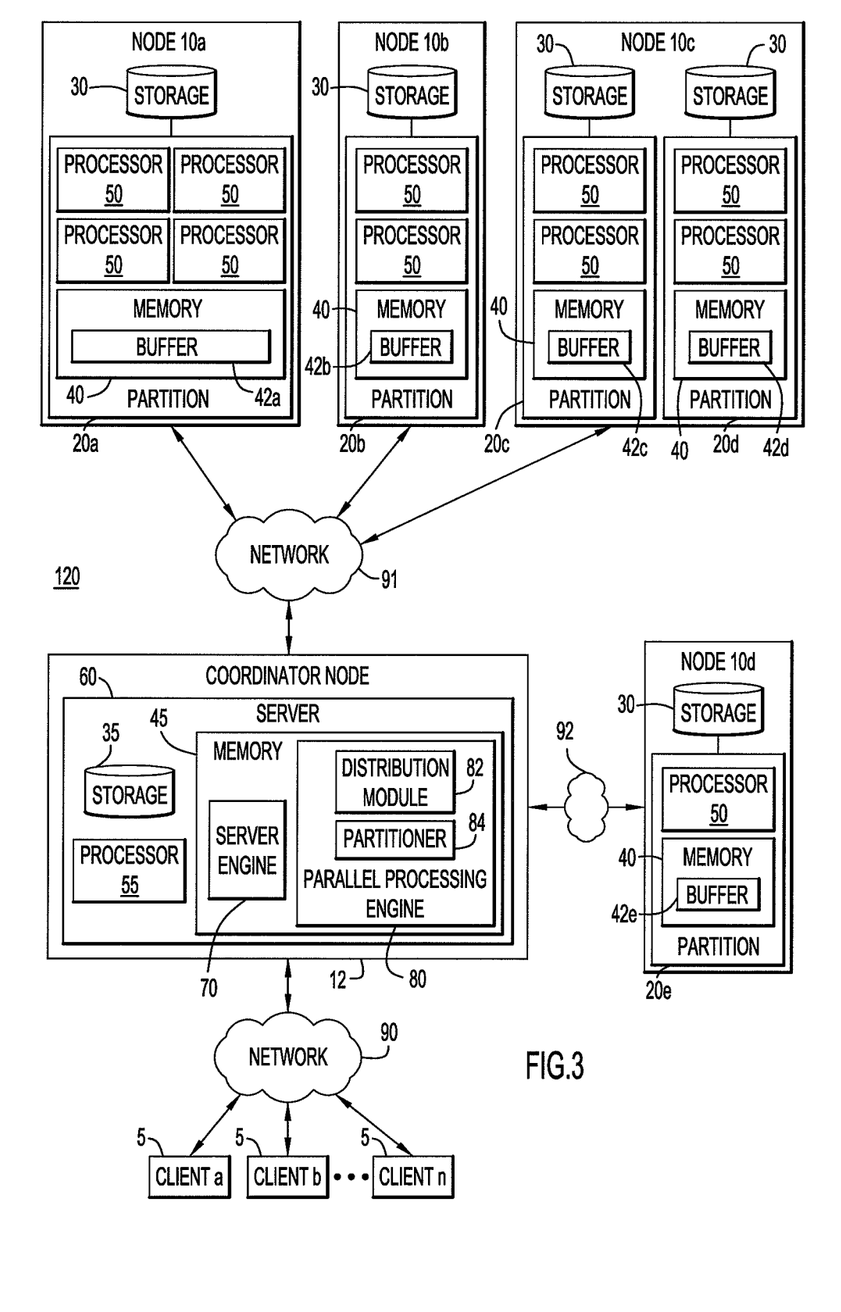
FIG. 3 is a block diagram illustrating a data processing system according to a third embodiment of the present invention.

The present embodiments improve the utilization of resources in a parallel data processing system, by dynamically distributing data among multiple partitions according to the relative data processing rates of each partition. Referring now to the Figures, three alternative parallel data processing systems 100, 110, 120 according to embodiments of the present invention are illustrated in FIGS. 1 through 3. Each system 100, 110, 120 comprises a plurality of partitions 20, on one or more processing nodes 10, 12. Each partition 20 is capable of independently processing a data transaction or a portion thereof.

The parallel data processing system 100, 110, 120 may be implemented in a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service. In a particular embodiment, the parallal data processing system 100, 110, 120 is an IBM InfoSphere DataStage system. Three exemplary embodiments are depicted in each of FIGS. 1 through 3: FIG. 1 depicts a Symmetric Multi-Processor (SMP) system, FIG. 2 depicts a Massively Parallel Processor (MMP) system, and FIG. 3 depicts a grid system in which there are multiple heterogeneous nodes.

Depending on the embodiment, the nodes 10, 12 may be data processing nodes 10 comprising one or more data partitions 20, or coordinator nodes 12 comprising a server 60 instead of, or in addition to, one or more data partitions 20. Each processing node 10 comprises one or more data partitions 20, each with its own storage area 30, memory 40, and one or more processors 50. Each partition 20 has a data buffer 42 allocated from memory 40, which buffers data (e.g., temporarily holds the data) to be processed by the partition 20. A partition 20 may comprise multiple processors 50, for example the partition 20a shown in FIG. 1, or may comprise a single processor, for example partitions 20c shown in FIG. 2. A single physical node may comprise multiple partitions, for example the coordinator node 12 shown in FIG. 1, or node 10c shown in FIG. 3, or may comprise only a single partition, for example node 10b shown in FIG. 3. As exemplified by the three different embodiments of FIGS. 1 through 3, the parallel data processing systems 100, 110, 120 may comprise a homogeneous or heterogeneous mix of nodes structurally, in the number of data partitions, or in any other suitable fashion.

Coordinator node 12 comprises a server 60, which comprises storage area 35, memory 45, and processor 55. Active in memory 45 are server engine 70 and parallel processing engine 80, which comprises distribution module 82 and partitioner 84. Coordinator node 12 may also comprise one or more data partitions 20, for example as shown in FIG. 1. It is understood that although no data partitions are shown on coordinator nodes 12 in FIGS. 2 and 3, such omission is for the sake of simplified illustration only.

The server 60 may be any server suitable for providing parallel processing services to other applications, computers, clients 5, etc. and may be, for example, an IBM Infosphere Datastage server. Server engine 70 may be a conventional or other server engine that provides the core services for storing, processing and securing data in the parallel data processing system 100, 110, 120, and may store data such as tables, indexes, etc. in storage areas 30, 35. Parallel processing engine 80 works with server engine 70 to provide parallel processing capability, for example by the distribution module 82 determining how to balance data distribution among the available data partitions 20, and instructing the partitioner 84 to partition the data among the available data partitions 20. The parallel processing engine 80 is more fully explained with respect to FIGS. 5 through 9.

Storage areas 30, 35 and memory 40, 45 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Each storage area 30, 35 may be, for example, one or more databases implemented on a solid state drive or in a RAM cloud. Storage area 30 and memory 40, and respective storage area 35 and memory 45, may be part of one virtual address space spanning multiple primary and secondary storage devices. Data in the system 100, 110, 120 (e.g., documents, files, emails, database tables, indexes, etc.) is stored in the storage areas 30, 35, for example a particular database table may be stored in multiple storage areas 30 on one or more nodes 10, some of the table rows may be stored in partition 20a and some of the table rows may be stored in partition 20b.

Processors 50, 55 are, for example, data processing devices such as microprocessors, microcontrollers, systems on a chip (SOCs), or other fixed or programmable logic, that executes instructions for process logic stored in respective memory 40, 45. Processors 50, 55 may themselves be multi-processors, and have multiple CPUs, multiple cores, multiple dies comprising multiple processors, etc. Because the data in systems 100, 110, 120 is divided among the multiple partitions 20, multiple processors 50 in the partitions 20 may be used to satisfy requests for information, e.g., data retrieval or update requests.

The depicted system 100, 110, 120 further comprises one or more user clients 5, which allow a user to interface with the data processing system, for example by entering data into the system or querying a database. Although user clients 5 are shown as interacting with coordinator node 12, it is understood that user clients 5 may interact with multiple nodes 10, 12, and that any node 10, 12 may act as the server or coordinator for a particular application or process. Client devices 5, which are described further with respect to FIG. 4, may be any conventional or other computer system or device, such as a thin client, computer terminal or workstation, personal desktop computer, laptop or netbook, tablet, cellular phone, networked television, or other device capable of acting as a client in the described parallel data processing system.

The processing nodes 10, 12 and user clients 5 are communicatively connected to each other, for example, via networks 90, 91, 92, which represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the system 100, 110, 120 may include any conventional or other communications devices to communicate over the networks via any conventional or other protocols, and may utilize any type of connection (e.g., wired, wireless, etc.) for access to the network.

The system 100, 110, 120 may include additional servers, clients, and other devices not shown, and individual components of the system may occur either singly or in multiples, for example, there may be more than one coordinator node 12 in the system, or for example, the functionality of various components (e.g., distribution module 82 and partitioner 84) may be combined into a single device or split among multiple devices. It is understood that any of the various components of the system 100, 110, 120 may be local to one another, or may be remote from and in communication with one or more other components via any suitable means, for example a network such as a WAN, a LAN, Internet, Intranet, mobile wireless, etc.

Figure 4:
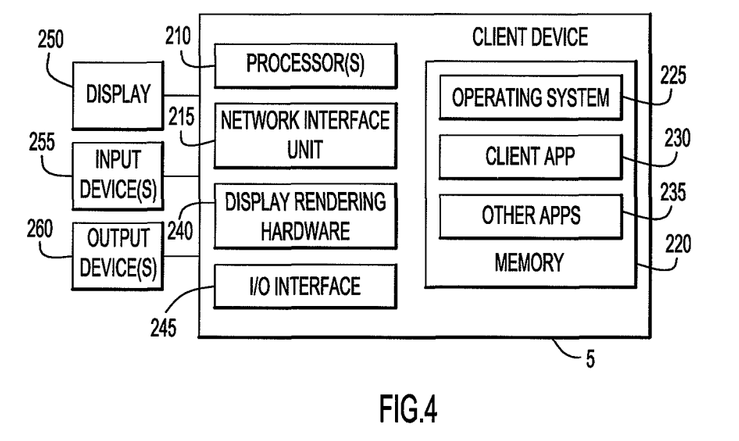
FIG. 4 is a block diagram illustrating a client device for use in a data processing system according to an embodiment of the present invention.

Referring to FIG. 4, an example of a client device 5 that may be used in system 100, 110, 120 is depicted. Client device 5 comprises one or more processors 210, a network interface unit 215, memory 220, display rendering hardware 240, and input/output interface 245. Resident in memory 220 are operating system 225, parallel data processing client application 230, and optionally other applications 235. The client application 230 provides an interface such as a graphical user interface (GUI) for a user of the client device 5 to interact with the parallel data processing server 60, for example client application 230 may be an IBM Infosphere Datastage client, a database client, etc. Processor 210 is, for example, a data processing device such as a microprocessor, microcontroller, system on a chip (SOCs), or other fixed or programmable logic, that executes instructions for process logic stored in memory 220. Network interface unit 215 enables communication to the parallel processing system 100, 110, 120. Memory 220 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 240 may be a part of processor 210, or may be, e.g., a separate Graphics Processor Unit (GPU).

I/O interface 245 enables communication between display device 250, input device(s) 260, and output device(s) 270, and the other components of client device 5, and may enable communication with these devices in any suitable fashion, e.g., via a wired or wireless connection. The display device

250 may be any suitable display, screen or monitor capable of displaying information to a user of a client device 5, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like. The display device 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

User clients 5, nodes 10, 12, and processors 50, 55, 210, may each be implemented in the form of a processing system, or may be in the form of software. They can each be implemented by any quantity of conventional or other computer systems or devices, such as a computing blade or blade server, thin client, computer terminal or workstation, personal computer, cellular phone or personal data assistant (PDA), or any other suitable device. A processing system may include any available operating system and any available software (e.g., browser software, communications software, word processing software, etc.). These systems may include processors, memories, internal or external communications devices (e.g., modem, network card, etc.), displays, and input devices (e.g., physical keyboard, touch screen, mouse, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

Figure 5:
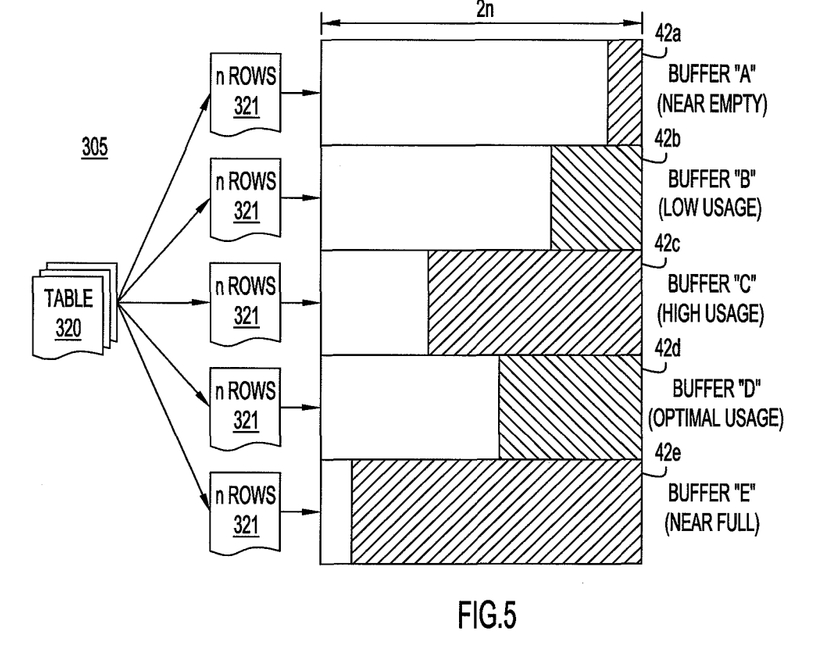
FIGS. 5, 6 and 7 are schematic diagrams depicting exemplary buffer usage in multiple data buffers at different stages of a dynamic data distribution process according to an embodiment of the present invention.
Figure 6:
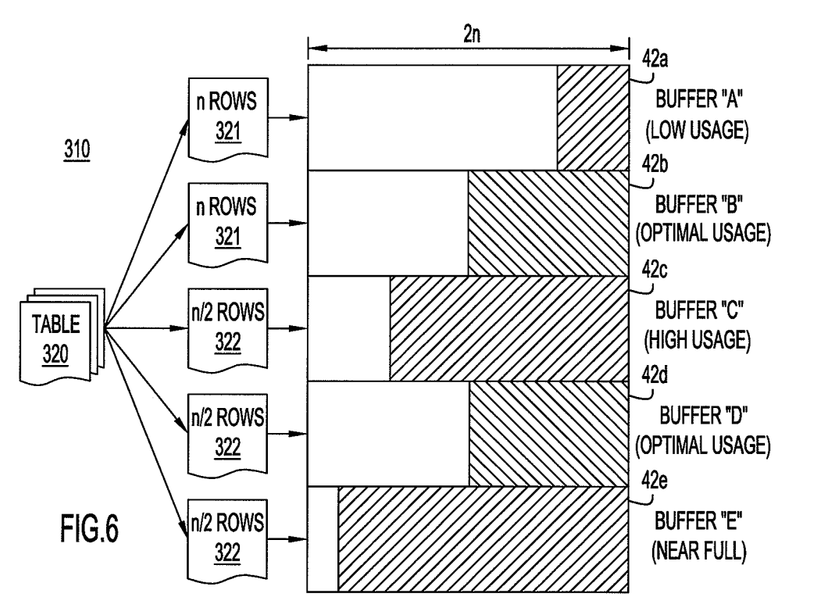
Figure 7:
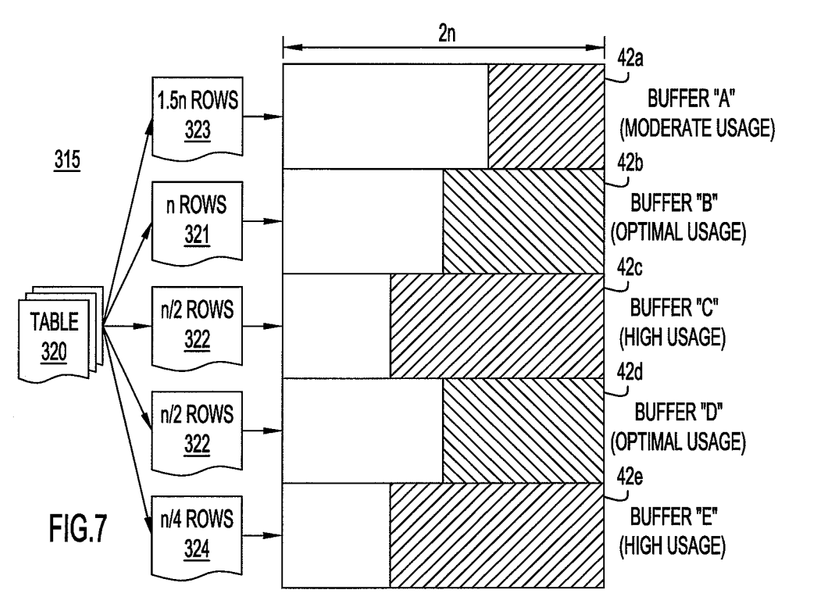

Referring now to FIGS. 5, 6 and 7, reference numerals 305, 310, 315 generally designate a schematic illustrating different stages of a dynamic data distribution process according to an embodiment of the present invention. In each Figure is depicted an exemplary table 320 that is being processed by the parallel data processing system. Parallel processing is achieved by the system (and particularly the parallel processing engine 80) dividing up portions of the table 320 to be processed, and distributing these portions in multiple passes or rounds to the individual buffers 42 on each data partition 20. In the depicted embodiment, the size of each buffer 42 is considered to have a certain size 2n, so that n is the number of data records (e.g., table rows) that should fill half of the allocated buffer size. Although five buffers 42a-42e, which are designated "A" through "E", are shown in FIGS. 5 through 7, it is understood that there may be more or fewer buffers in the system, depending on the number of available data partitions.

FIG. 5 depicts a first cycle of data distribution according to an embodiment of the present invention. In this cycle, the parallel processing engine 80 distributes n data records (rows 321) to each buffer. The cycle comprises one or more passes, where in each pass the engine distributes x rows at a time to each buffer, so that for the first cycle, the engine distributes n*x rows to each buffer. In the depicted embodiment, the initial value of x is set to 1, so that over the entire first cycle, the engine distributes n rows to each buffer. As can be seen from the schematic representation of buffer usage, at the end of the first cycle buffer "A" 42a is nearly empty because its partition has processed the data rows 321 at a much faster processing speed than buffer "C" 42c or buffer "D" 42d. On the other hand, buffer "E" 42e is nearly full, because its partition is processing the data rows 321 at a much slower processing speed than the other buffers. These disparities in data processing speed may be caused by one or more factors such as the size of the partition 20, the availability and speed of the memory 40 and processors 50 in each partition, clock speed, bus speed, the operating system operable in each partition 20, the efficiency of context switching, data record size, the transformations being performed, etc.

As is more fully described with reference to FIG. 8, the parallel processing engine 80 monitors this buffer usage information from the partitions, and determines the data processing rates of the partitions based on the retrieved buffer usage information. Then, in subsequent cycles of data distribution, for example the subsequent cycle depicted in FIG. 6, the parallel processing engine 80 dynamically adjusts the amount of data distributed to each partition, so that more data is distributed to higher performing partitions, and less data is distributed to lower performing partitions. In the depicted embodiment, the cycle comprises n/2 passes, where in each pass the engine distributes to each buffer a fraction or multiple of x depending on the data processing capacity of that buffer, so that over the entire cycle, the engine distributes (n/2)*(buffer data capacity) rows to each buffer.

As shown in FIG. 6, each buffer performing at optimal or higher usage (buffers "C", "D" and "E" 42c, 42d, 42e) has a determined data processing capacity of x, so that over the entire cycle the parallel processing engine 80 distributes n/2 data rows (rows 322) to each of these buffers. The higher performing buffers "A" and "B" 42a, 42b have a determined data processing capacity of 2x, so that over the entire cycle the engine distributes n data rows (rows 321) to each of these higher performing buffers. This distribution results in buffers "A" and "B" 42a, 42b showing a higher usage than after the first cycle of data distribution, thereby improving overall data processing performance because data processing is no longer bottlenecked by the lowest performing partition(s) (here, partition "E" 42e), and the highest performing partition(s) (here, partition "A" 42a) is not starved for data. It is understood that if the fraction of x is less than 1 and a row cannot be subdivided, then the engine may skip over a particular row in one or more passes so that the total number of rows distributed to the buffer for the entire cycle is correct. For example, if x is ,1, and a particular buffer has a data processing capacity of x/2, then the engine may distribute a row to that buffer in every other pass in the cycle.

After the cycle of data distribution depicted in FIG. 6, the parallel processing engine 80 once again dynamically adjusts the amount of data distributed to each partition according to its relative processing rates, so that more data is distributed to higher performing partitions, and less data is distributed to lower performing partitions. As shown in FIG. 7, the highest performing buffer "A" 42a has a determined data processing capacity of 3x, so that over the entire cycle the parallel processing engine 80 distributes 1.5n data rows (rows 323) to it, and high performing buffer "B" 42b has a determined data processing capacity of 2x, so that over the entire cycle the engine distributes n data rows (rows 321) to it. Similarly, the buffers performing within the optimal or high usage range (buffers "C" and "D" 42c, 42d) have a determined data processing capacity of x, so that over the entire cycle the engine distributes n/2 data rows (rows 322) to them, and the lowest performing buffer "E" 42e has a determined data processing capacity of x/2, so that over the entire cycle the engine distributes n/4 data rows (rows 324) to it. This distribution results in the highest performing partition "A" showing increased buffer usage as it processes more data, and partition "E" showing decreased buffer usage as it processes less data, thereby improving data processing performance of the entire parallel data processing system.

As can be understood from this exemplary illustration, the dynamic data distribution process of the present embodiments enhances non-key-based data partitioning methods such as round robin methods by dynamically adjusting data distribution across all data partitions based on their processing capabilities. The dynamic data distribution process dispenses more data to higher performing partitions, and may also dispense less data to lower performing partitions, thereby ensuring that no partition starves for data, data processing is no longer bottlenecked by the lowest performing partition, and all partitions can proceed at high capacity, even though some might be performing faster than others. The dynamic data distribution process significantly improves system resource utilization, does not require large data buffer sizes or complicated experimentation and analysis for determining optimal buffer sizes, and adds little computing complexity or additional demands on system resources.

Figure 8:
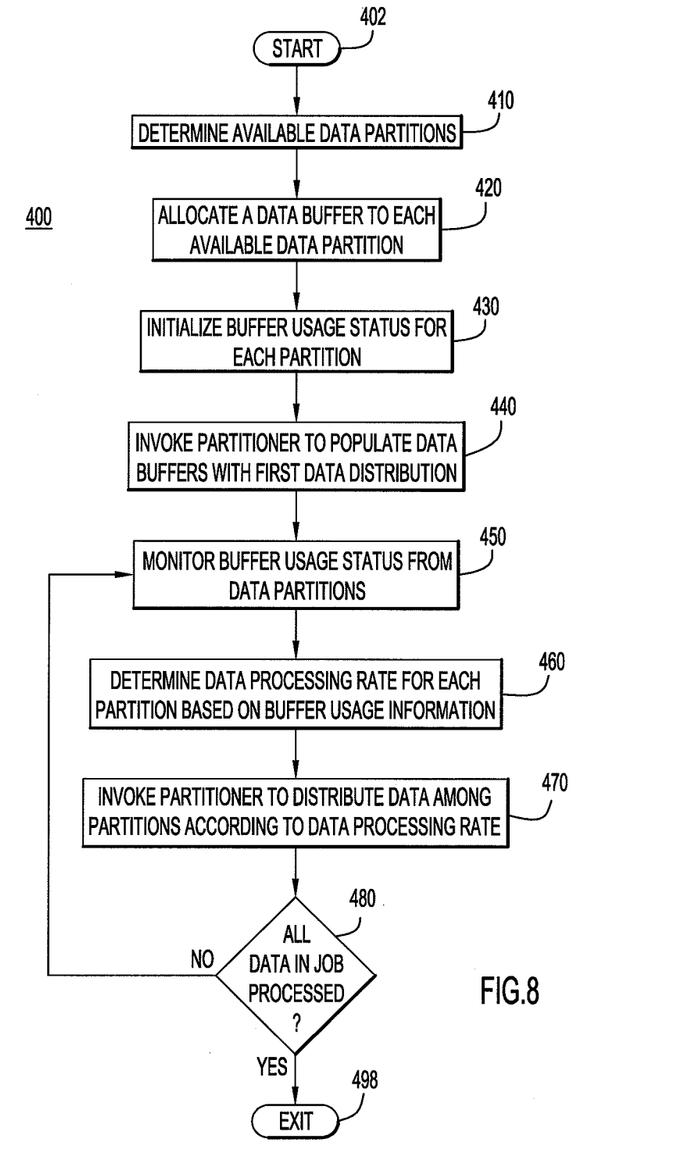
FIG. 8 is a flowchart depicting a process of dynamic data distribution according to an embodiment of the present invention.

Referring now to FIG. 8, reference numeral 400 generally designates a flowchart depicting a an exemplary process of dynamic data distribution according to an embodiment of the present invention, which may be carried out by the parallel processing engine 80 previously described, and in particular by the distribution module 82. The process starts at step 402, for example by a user starting a parallel data processing job, or by the receipt of a request from a particular application or system module invoking the parallel processing engine 80 to partition a data job, such as incoming data or a data query. In step 410, the distribution module 82 determines the data partitions 20 that are available for this processing event, and in step 420 allocates a data buffer 42 to each available data partition 20.

In step 430, the distribution module 82 initializes the buffer usage status for each partition, for example by determining the number of data records (rows) that fill a certain percentage of the allocated buffer size. For example, the distribution module 82 may determine that the buffer size has the value 2n, where n is the number of data records (rows) that should fill half of the allocated buffer size. In step 440, the distribution module 82 invokes partitioner 84 to populate the data buffers 42 with the first data distribution, which may be, for example, the distribution of n data records (rows) to each data partition 20. In one embodiment, the first data distribution cycle may comprise the distribution of equal numbers of data records (rows) to each buffer 42 in one or more rounds. In another embodiment, the distribution module 82 may use information about each partition 20, for example historical data processing rates or estimated processing rates based on, e.g., memory size, processing speed, and total number of cores per partition, to customize the first data distribution such that buffers associated with partitions that are expected to have higher data processing rates receive larger numbers of data records to process than buffers associated with partitions that are expected to have lower data processing rates. The historical and estimated processing rates may be stored in storage area 35, for example in a partition processing table or array.

In step 450, the distribution module 82 monitors the buffer usage status from the data partitions 20, for example by retrieving the buffer usage status from the partitions, and in step 460 determines the data processing rate or capacity for each partition 20 based on the buffer usage information. For example, if a particular buffer "A" has a nearly empty buffer, but another buffer "E" has a buffer that is nearly full, then the partition comprising buffer "A" has a higher data processing rate than the partition comprising buffer "E". Thus, the low data processing rate of partition "E" will slow down or "gate" the overall parallel data processing if data is continued to be distributed equally to all of the partitions. To prevent this occurrence, the distribution module 82 uses the buffer usage information to determine a more optimal utilization of the partitions, for example by designating more data to be distributed to higher performing partitions such as partition "A", and less data to be distributed to lower performing partitions such as partition "E". The determined data processing rates may be stored in storage area 35, for example in a partition processing table or array.

In step 470, the distribution module 82 invokes the partitioner 84 to distribute another cycle or cycles of data to the buffers according to the determined data processing rate for each partition. For example, the partitioner 84 may carry out two or three cycles of data distribution, where in each cycle, the partitioner 84 distributes 2n data records to the buffers of each of the highest performing partitions, n/2 data records to buffers of the each of the lowest performing partitions, and n data records to the remaining partitions. In step 480, the distribution module 82 determines if all data in the current job has been processed, and if yes exits the process at step 498. If no, then the distribution module 82 loops back to step 450 to once again retrieve and evaluate the buffer usage status from each data partition 20. Upon exit, the parallel processing engine 80 may, e.g., return the results of the partitioned and processed data to the server engine 70.

Figure 9:
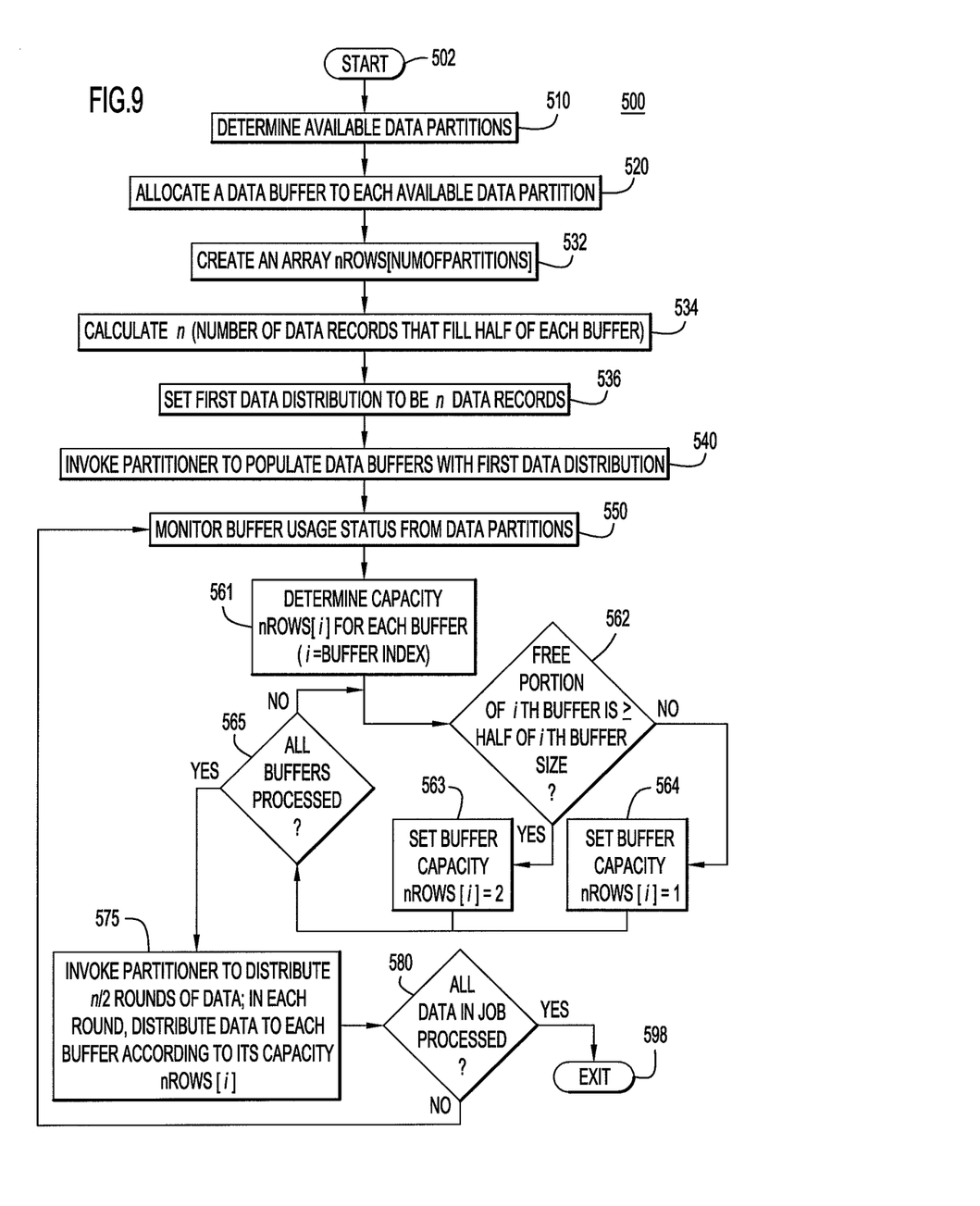
FIG. 9 is a flowchart depicting a process of dynamic data distribution according to an alternate embodiment of the present invention.

Referring now to FIG. 9, reference numeral 500 generally designates a flowchart depicting a an exemplary process of dynamic data distribution according to an alternate embodiment of the present invention, which may be carried out by the parallel processing engine 80 previously described, and in particular by the distribution module 82. This process 500 illustrates a particularly simple and lightweight embodiment of the dynamic data distribution process. The process starts at step 502, for example by a user starting a parallel data processing job, or by the receipt of a request from a particular application or system module invoking the parallel processing engine 80 to partition a data job, such as incoming data or a data query. In step 510, the distribution module 82 determines the data partitions 20 that are available for this processing event, and in step 520 allocates a data buffer 42 to each available data partition 20.

In step 532 through 536, the distribution module 82 initializes the buffer usage status for each partition. In step 532, the distribution module 82 creates an array nRows [numofPartitions] where numof Partitions is the number of available data partitions 20 that will be utilized for this particular data job. The distribution module 82 utilizes the array nRows to store the number of data rows to be distributed to each partition in the next data distribution cycle, and stores the array in, e.g.; storage area 35. In step 534, the distribution module 82 calculates n, which is the number of data records (rows) that should fill half of the allocated buffer size. For example, n=bufferSize/recordSize/2. In step 536 the distribution module 82 sets the first data distribution to be n data records (rows) for each partition. In step 540, the distribution module 82 invokes partitioner 84 to populate the data buffers 42 with the first data distribution, which may be, for example, the distribution of n data records (rows) to each data partition 20.

In step 550, the distribution module 82 monitors the buffer usage status from the data partitions 20, for example by retrieving the buffer usage status from the partitions. In step 561, the distribution module 82 determines the available capacity nRows[i] for each buffer, where i is the buffer index, by proceeding through the loop of steps 562 through 565 for each buffer. In step 562, the distribution module determines if the free portion of the ith buffer is equal to or greater than more than half of its total buffer size, and if yes, in step 563 sets the buffer capacity nRows[i]=2, and if no, in step 564 sets the buffer capacity nRows[i]=1. Buffer capacity is stored in array nRows. After step 563 or step 564, the distribution module 82 checks in step 565 whether all buffers have been processed, e.g., whether buffer capacity has been determined for each buffer. If not, the distribution module 82 re-enters the loop of steps 562 through 565 for the remaining unprocessed buffers. If yes, the distribution module continues to step 575.

In step 575, the distribution module 82 invokes the partitioner 84 to perform n/2 rounds or passes of data distribution to the buffers of each partition according to the determined data processing capacity for each partition/buffer. In each round of data distribution, the partitioner 84 distributes data to each buffer according to its buffer capacity nRows[i]. Thus, for example, if the buffer capacity nRows[i] for buffer[i] has a value of 2, then in each round the partitioner 84 will distribute 2 rows to buffer[i], so that over the entire data distribution cycle of n/2 rounds, a total of n rows are distributed to buffer[i]. In step 580, the distribution module 82 determines if all data in the current job has been processed, and if yes exits the process at step 598. If no, then the distribution module 82 loops back to step 550 to once again retrieve and evaluate the buffer usage status from each data partition 20. Upon exit, the parallel processing engine 80 may, e.g., return the results of the partitioned and processed data to the server engine 70.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Java, P1/1, Fortran or other programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for dynamically distributing data in a parallel processing system, comprising:
    a computer readable memory device having computer readable program code stored thereon, the computer readable program code comprising computer readable program code configured to:
        allocate data buffers to respective data partitions defined in the parallel processing system, each data buffer having a predefined size in which data are stored for processing by the corresponding data partition;
        distribute data records of a common data structure across the data buffers for parallel processing by the respective data partitions, wherein a number of data records for each of the data partitions is selected independently of the number of data records selected for all other of the data partitions;
        determine data buffer usage at each of the data partitions by comparing a size of a free portion of the corresponding data buffer to a size criterion of the data buffer, wherein the size criterion of the data buffer is greater than zero and less than the data buffer size; and
        distribute remaining data records of the common data structure across the data buffers based on the respective data buffer usage thereof, wherein the number of remaining data records is selected independently of the number of remaining data records selected for all other of the remaining data partitions.

2. The computer program product of claim 1, wherein the distributing of the data records and of the remaining data records are performed using a round robin distribution technique.

3. The computer program product of claim 1, wherein the computer readable program code is further configured to:
    determine a data processing capacity based on the data buffer usage at each of the data partitions; and
    store the determined data processing capacity of each data partition in a partition processing table.

4. The computer program product of claim 3, wherein the data processing capacity for each data partition has an initial value based on a historical data processing rate for that data partition, and wherein the historical data processing rates are stored in the partition processing table.

5. The computer program product of claim 3, wherein the data processing capacity for each data partition has an initial value based on an estimated data processing rate for that data partition, and wherein the estimated data processing rates are stored in the partition processing table.

6. The computer program product of claim 1, wherein the computer readable program code is further configured to:
modify the size criterion to be greater than or equal to half of the data buffer size and less than the data buffer size;
for each data partition, in response to affirming that the free portion of the data buffer meets the modified size criterion, increase the data processing capacity of the data partition; and
distribute the remaining data records across the data buffers based on the respective data buffer usage thereof.

7. The computer program product of claim 3,
wherein each data buffer has a size 2n, where n is a number of the data records having a total size that is expected to fill half of each data buffer; and
wherein the computer readable program code is further configured to:
re-determine the data processing capacity after every n/2 rounds of distributing the data records and distributing the remaining data records.

8. The computer program product of claim 7, wherein the data processing capacity has an initial value of x, and the re-determining of the data processing capacity further comprises:
for each data partition, in response to affirming that the size of the free portion of the corresponding data buffer is greater than or equal to half of the data buffer size, setting the data processing capacity of that data partition to a value greater than x, and in response to affirming that the size of the free portion of the corresponding data buffer is not greater than or equal to half of the data buffer size, setting the data processing capacity of that data partition to x.

9. The computer program product of claim 7, wherein the data processing capacity has an initial value of x, and the re-determining of the data processing capacity further comprises:
for each data partition, in response to affirming that the size of the free portion of the corresponding data buffer is greater than or equal to half of the data buffer size, setting the data processing capacity of that data partition to a value less than x, and in response to affirming that the size of the free portion of the corresponding data buffer is not greater than or equal to half of the data buffer size, setting the data processing capacity of that data partition to x.

10. A system for dynamically distributing data in a parallel processing system, comprising:
a plurality of data processing partitions; and
a processor configured with logic to:
allocate data buffers to respective data partitions defined in the parallel processing system, each data buffer having a predefined size in which data are stored for processing by the corresponding data partition;
distribute data records of a common data structure across the data buffers for parallel processing by the respective data partitions, wherein a number of data records for each of the data partitions is selected independently of the number of the data records selected for all other of the data partitions;
determine data buffer usage at each of the data partitions by comparing a size of a free portion of the corresponding data buffer to a size criterion of the data buffer, wherein the size criterion of the data buffer is greater than zero and less than the data buffer size; and
distribute remaining data records of the common data structure across the data buffers based on the respective data buffer usage thereof, wherein the number of data records is selected independently of the number of data records selected for all other of the remaining data partitions.

11. The system of claim 10, wherein the distributing of the data records and of the remaining data records are performed using a round robin distribution technique.

12. The system of claim 10, wherein the system further comprises a memory, and the processor is further configured to:
determine a data processing capacity based on the data buffer usage at each of the data partitions; and
store the determined data processing capacity of each data partition in a partition processing table in the memory.

13. The system of claim 12,
wherein each data buffer has a size 2n, where n is a number of the data records having a total size that is expected to fill half of each data buffer; and
wherein the processor is further configured with logic to:
re-determine the data processing capacity after every n/2 rounds of distributing the data records and distributing the remaining data records.

14. The system of claim 13, wherein the data processing capacity has an initial value of x, and the re-determining of the data processing capacity further comprises:
for each data partition, in response to affirming that the size of the free portion of the corresponding data buffer is greater than or equal to half of the data buffer size, setting the determined data processing capacity of that data partition to a value greater than x, and in response to affirming that the size of the free portion of the corresponding data buffer is not greater than or equal to half the data buffer size, setting the data processing capacity of that data partition to x.

15. The system of claim 10, wherein the partitions are physically located on a single multi-processor system.

16. The system of claim 10, wherein the partitions are physically located on multiple nodes in a distributed computer system.

17. The computer program product of claim 7, wherein the data processing capacity has an initial value of x, and the re-determining of the data processing capacity further comprises:
for each data partition, in response to affirming that the size of the free portion of the corresponding data buffer is greater than or equal to a predetermined fraction of the data buffer size, setting the data processing capacity of that data partition to a value greater than x, and in response to affirming that the size of the free portion of the corresponding data buffer is not greater than or equal to the predetermined fraction of the data buffer size, setting the data processing capacity of that data partition to a value less than or equal to x.

18. The system of claim 13, wherein the data processing capacity has an initial value of x, and the re-determining of the data processing capacity further comprises:

for each data partition, in response to affirming that the size of the free portion of the corresponding data buffer is greater than or equal to a predetermined fraction of the data buffer size, setting the determined data processing capacity of that data partition to a value greater than x, and in response to affirming that the size of the free portion of the corresponding data buffer is greater than or equal to the predetermined fraction of the data buffer size, setting the data processing capacity of that data partition to a value less than or equal to x.

19. The system of claim 13, wherein the re-determining of the data processing capacity further comprises:
for each data partition, in response to affirming that the size of the free portion is greater than or equal to the size of a predetermined portion of the data buffer, increasing the data processing capacity of that data partition, wherein the size of the predetermined portion of the data buffer is greater than or equal to half of the data buffer size and less than the data buffer size.

* * * * *